United States Patent [19]

Myer

[11] 4,153,347
[45] May 8, 1979

[54] EYEGLASS FRAMES WITH REMOVABLE, INTERCHANGEABLE LENSES, RIMS AND TEMPLE PIECES

[76] Inventor: C. Randolph Myer, P.O. Box 254, Beverly Farms, Mass. 01915

[21] Appl. No.: 804,789

[22] Filed: Jun. 8, 1977

[51] Int. Cl.² ............................................. G02C 1/08
[52] U.S. Cl. .................................. 351/90; 16/128 A; 351/116; 351/121
[58] Field of Search .................. 351/92, 95, 116, 121, 351/153, 90; 16/128 A, DIG. 13

[56] References Cited

FOREIGN PATENT DOCUMENTS

| | | | |
|---|---|---|---|
| 954467 | 6/1949 | France ..................................... | 351/153 |
| 478783 | 3/1953 | Italy ........................................ | 351/153 |
| 671489 | 10/1964 | Italy ........................................ | 351/116 |
| 654605 | 6/1951 | United Kingdom .................. | 16/128 A |

Primary Examiner—Paul A. Sacher

[57] ABSTRACT

Eyeglass frames are disclosed in which the right and left lens rims are split to facilitate insertion and removal of lenses. A pair of flanges on each rim adjacent the split mate to form a composite lug which is received between upper and lower arms on the associated temple pieces whereby the rims are held in the closed position. Pivot pin means are provided to secure the temple pieces to the lugs on the lens rims. The lug and pivot pin arrangement is generally useful for securing removable temple pieces to lens rims.

21 Claims, 7 Drawing Figures

EYEGLASS FRAMES WITH REMOVABLE, INTERCHANGEABLE LENSES, RIMS AND TEMPLE PIECES

BACKGROUND OF THE INVENTION

This invention relates to eyeglass frames. More particularly, this invention relates to eyeglass frames designed for ready insertion and removal of lenses.

It is well known that many people have visual problems which require them to wear corrective lenses in order to see properly. Commonly, such lenses are mounted in a pair of eyeglass frames comprising a pair of lens rims joined to each other, usually via a bridge portion, which are placed upon the nose of the wearer. A temple piece which extends backward over the wearer's ears, is provided at the outer edge of each rim.

Continuing changes in a person's vision necessitate periodic reexaminations of their eyes and usually purchase of new corrective lenses. In many instances the old eyeglass frames are still servicable, but because of the difficulty of removing the old lenses and installing the new, new eyeglass frames are purchased instead.

In addition to the purely utilitarian function of holding a pair of corrective lenses, eyeglass frames also serve an ornamental function. Eyeglass frames are, in fact, a form of jewelry. Some persons have gone so far as to have a different pair of eyeglasses to match different outfits of clothing. This practice, however, is wasteful because a separate set of expensive corrective lenses ordinarily is purchased for each pair of frames, due to the difficulty of removing and replacing the lenses from most eyeglass frames.

Attempts have been made in the prior art to provide eyeglass frames with split rims to facilitate removal and insertion of lenses. Examples are Talobre U.S. Pat. No. 2,473,619; Amaru U.S. Pat. No. 3,589,802 and Livas U.S. Pat. No. 3,762,804. Such prior designs have not been completely satisfactory either because special tools such as tiny jeweler's screwdrivers, have been required to open the frames for insertion or removal of a lens or because the lenses have not been mounted in the frames securely enough to prevent them from falling out at inopportune moments.

Others in the prior art have attempted to provide readily removable and replaceable temple pieces. Such patents include Spill U.S. Pat. No. 2,210,507; Rosenheim U.S. Pat. No. 2,379,928; Rosenheim U.S. Pat. No. 2,504,157; Eloranta U.S. Pat. No. 2,671,379; Dunbar U.S. Pat. No. 3,744,887 and Manufacture Oyonnaxienne French Pat. No. 1,037,166. Such devices are subject to the disadvantge that in many instances the removable temple pieces exhibit an undesirable tendency to separate from the frames, particularly when the glasses are not in use and are folded in the closed position.

Yet another disadvantage of many prior art glasses' frames is the tendency of such frames to fall off particularly when the wearer tips his head forward to look down at something. In some instances, the glasses may even be lost, for example when the wearer is looking down from an elevated position or from above a body of water. To combat this problem, a safety strap is sometimes positioned around the back of the head or neck of the wearer with the ends of the strap secured to the temple pieces of the eyeglass frames. Such safety straps are, however, unwieldy and inconvenient. Others have attempted to overcome this problem by designing the eyeglass frames so that the temple pieces exert a pressure against the head of the wearer. Such devices include those disclosed in Pyle U.S. Pat. No. 347,738; Nelson U.S. Pat. No. 2,608,905; Amundsen U.S. Pat. No. 3,001,200; Chartrice U.S. Pat. No. 3,395,964 and Lyons U.S. Pat. No. 3,654,376.

A further disadvantage of prior art glasses frames involves the use of tiny, precision hinges, called findings, which materially add to the difficulty and expense of manufacturing the frames.

OBJECTS OF THE INVENTION

Accordingly, it is an object of the present invention to provide eyeglass frames in which the lenses may be readily inserted or removed.

It is also an object of this invention to provide a set of eyeglass frames in which lenses may be exchanged without the use of special tools.

Another object of the invention is to provide a set of eyeglass frames in which the lenses may be readily interchanged, but which hold the lenses securely and prevent them from falling out at inopportune moments.

Yet another object of the present invention is to provide a set of eyeglass frames from which the temple pieces may be readily removed and exchanged.

A further object of the present invention is to provide a set of eyeglass frames in which the temple pieces exert a pressure on the head of a wearer. An additional object of the present invention is to provide a set of glasses frames which dispenses with the use of expensive findings to facilitate pivoting of the temple pieces between the open and closed positions.

Other objects of the invention will appear more fully from a consideration of the following description.

SUMMARY OF THE INVENTION

These and other objects of the invention are achieved by a pair of eyeglass frames comprising right and left lens rims joined to each other, each of the rims being split at a point generally opposite the point where it is joined to the other rim in order to facilitate insertion and removal of a lens, a pair of flanges on each rim adjacent the split on each side thereof, the flanges of each pair mating to form a composite lug when the split in the rim is closed, pivot pin seating means in each composite lug, entry channel means in each composite lug leading from the periphery of the composite lug to the pivot pin seating means, a pair of temple pieces each having upper and lower mounting means projecting from the rim end thereof, the upper and lower mounting arms being spaced apart a distance corresponding to the combined vertical height of the mated flanges which make up the composite lug, and pivot pin means mounted on the upper and lower mounting arms of each temple piece, said pivot pin means being adapted to pass through the entry channel means in an associated composite lug and seat in the pivot pin seating means whereby the flanges of the composite lug are secured in mating position between the upper and lower mounting arms of the temple piece and the associated rim is locked in the closed position.

The objects of the invention are also achieved by providing a pair of eyeglass frames comprising right and left lens rims joined to each other, each of the rims being split at a point generally opposite the point at which it is joined to the other rim in order to facilitate insertion and removal of a lens, a pair of flanges on each rim adjacent the split on each side thereof, the flanges of each pair mating to form a composite lug when the split in the rim is closed, a pair of temple pieces each having upper and lower mounting arms projecting from the rim end thereof, the upper and lower mounting arms being spaced apart a distance corresponding to the combined vertical height of the mated flanges which make up the composite lug, each temple piece being associated with one of the rims and being disposed with the lug on the associated rim positioned between the upper and lower mounting arms of the temple piece whereby the flanges of the composite lug are secured in mating position and the associated rim is locked in the closed position, and pivot pin means extending between the temple piece mounting arms through an aperture in the associated composite lug, said pivot pin means being removable from the composite lug aperture.

In a further aspect of the present invention there is provided a pair of eyeglass frames with removable temple pieces comprising right and left lens rims joined to each other, each of the rims being a mounting lug at a point generally opposite the point where it is joined to the other rim; pivot pin seating means in each lug comprising a pin receiving aperture extending through the lug from top to bottom; entry channel means in each lug comprising an open slot extending through the lug from top to bottom and leading from the periphery of the lug to the pivot pin seating means, at least a portion of the slot being inclined from vertical, a pair of right and left temple pieces each having upper and lower mounting arms projecting from the rim end thereof, with the arms being spaced apart a distance corresponding to the height of the lug, and pivot pin means comprising an inclined pin mounted between the upper and lower mounting arms of each temple piece, wherein the pin is adapted to pass through the entry channel means in one of the lugs and seat in the pivot pin seating means.

BRIEF DESCRIPTION OF THE DRAWINGS

The invention will be explained in further detail with reference to the following drawings wherein.

DETAILED DESCRIPTION OF THE PREFERRED EMBODIMENT

Figure 1:
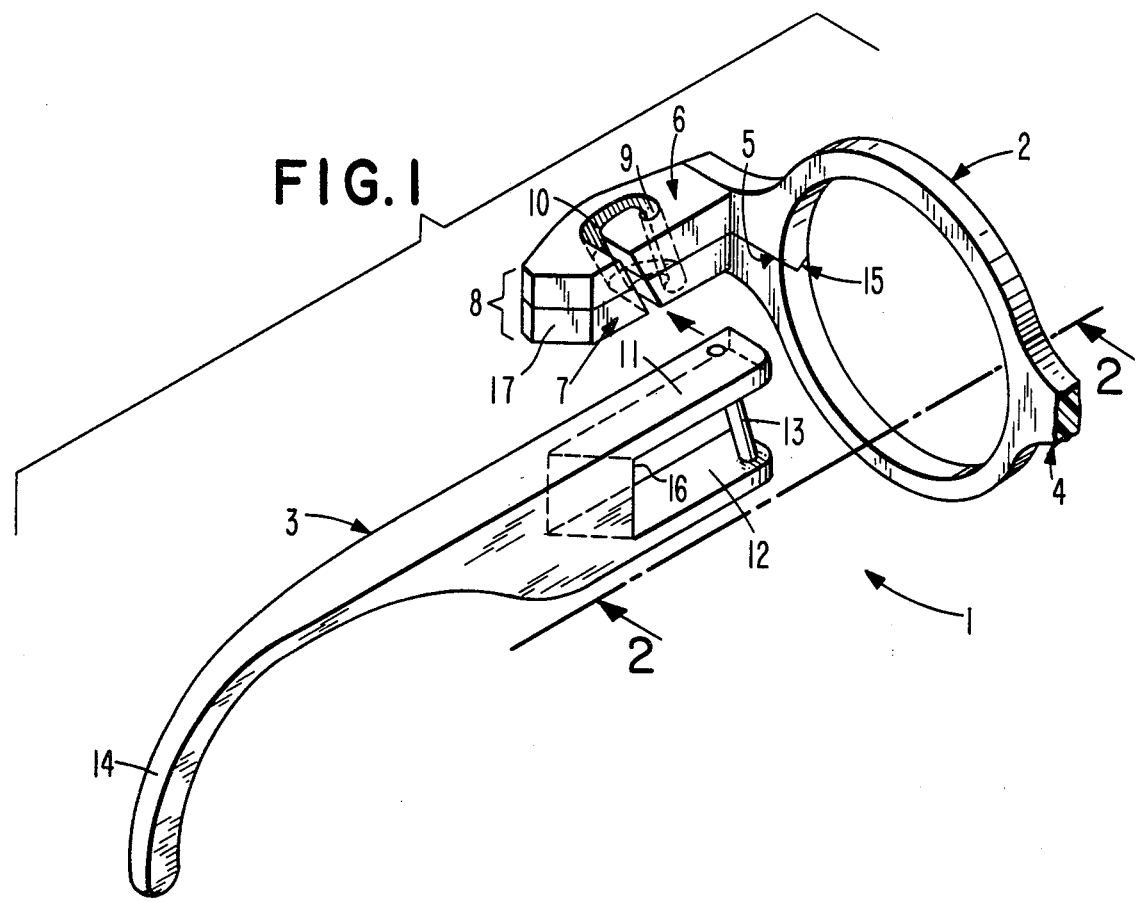
FIG. 1 is an exploded perspective view of one half of a set of eyeglass frames according to the present invention.

FIG. 1 shows one half of a set of eyeglass frames according to the present invention. Only half is illustrated in order to simplify the drawing, and it is to be understood that the unillustrated half of the eyeglass frames is a mirror image of the illustrated portion. The eyeglass frames are generally designated by a reference numeral 1 and the illustrated portion comprises a left rim portion 2 and a left temple piece 3. Left rim portion 2 is joined to a corresponding mirror image right rim portion (not shown) via a bridge portion 4. Rim 2 is provided with a split 5 at a point generally opposite from bridge portion 4 to allow the rim to be opened up in order to facilitate insertion and/or removal of a lens. A pair of flanges are formed integrally with rim 2 adjacent split 5 on either side thereof. The upper flange is designated by a reference numeral 6 and the lower by reference numeral 7. Flanges 6 and 7 mate to form a composite lug 8 which is provided with a pivot pin seat 9 extending completely through the lug from top to bottom. An inlet channel or slot 10 leads from the periphery of lug 8 to pivot pin seat 9. As can be seen from the drawing, portions of entry channel 10 are inclined with respect to the top and bottom surfaces of lug 8. The inclination of the entry channel is important in the locking action described hereinafter. For reasons of appearance, it is preferred to have the inlet channel start at the inside of lug 8, i.e., the side adjacent the wearer's head.

The rim end of temple piece 3 is provided with upper and lower mounting arms 11 and 12 respectively between which is extended a firmly mounted, inclined pivot pin 13. At the opposite end of temple piece 3 from the mounting arms there is an earpiece 14 configured to fit behind the ear of a wearer. In order to assemble the temple piece to the rim, the temple piece is turned until the inclination of pivot pin 13 matches the inclination of entry channel 10 and pin 13 is passed through the entry channel until it reaches the seat position at the end thereof. Desirably, the direction and degree of inclination of pivot pin 13 is chosen so that it will match the inclination of the entry channel when the temple piece is oriented at an angle intermediate the position assumed when the eyeglass frames are open for wearing and the position assumed when the eyeglass frames are closed for storage. In passing pin 13 through entry channel 10 lug 8 is received between the upper and lower mounting arms 11 and 12. Because the spacing between the upper and lower mounting arms corresponds to the height of the lug, split 5 is held in the closed position, and a lens mounted in rim 2 is thereby held secure. Preferably, the flanges 6 and 7 are provided with alignment means such as the ridge and groove arrangement illustrated at 15 in order to assure proper alignment and registration when mated to form composite lug 8. When temple piece 3 is rotated outwardly to the normal wearing position, i.e., to a position generally perpendicular to the plane of rim 2, the face 16 of the temple piece disposed between upper and lower mounting arms 11 and 12 engages beveled surface 17 on lug 8 in order to prevent further outward rotation of the temple piece. If the spacing between the temple pieces in the open position is made ever so slightly less than the width of the wearer's head, then the frames will exert a slight pressure on the sides of the wearer's head due to the natural resilience of the material from which the frames are made, and the pressure will act to hold the glasses in place.

Figure 2:
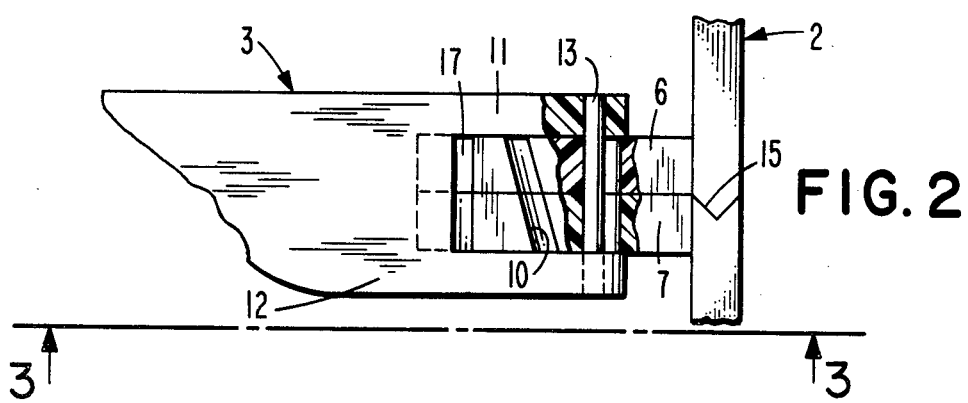
FIG. 2 is an elevation view of the eyeglass frames of FIG. 1 in assembled relation, partially cut away to show the pivot pin in its seat.

FIG. 2 shows somewhat more clearly the ridge and groove arrangement 15 which assures proper mating of flange 6 and flange 7 to form lug 8. This figure also clearly depicts how the spacing between upper mounting arm 11 and lower mounting arm 12 on temple piece 3 corresponds to the combined height of flanges 6 and 7 so that rim 2 is held securely in the closed position when lug 8 is received between the temple piece mounting arms. The inclination of the inclined portions of entry channel 10 is also clearly visible in FIG. 2.

Figure 3:
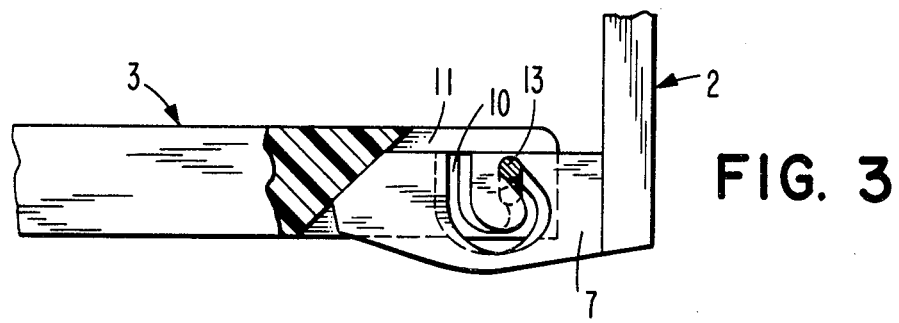
FIG. 3 is a bottom plan view of a portion of the eyeglass frames of FIGS. 1 and 2 with the lower mounting arm of the temple piece cut away to reveal the shape of the entry channel in the composite lug.

In FIG. 3, the lower temple piece mounting arm 12 has been cut away to reveal the underside of flange 7 which forms the bottom of lug 8. The inclination of entry channel 10 is clearly shown by the lack of registration between the bottom of the channel, shown in solid lines and the top of the channel, which is shown in dotted lines. Because of the inclination of pivot pin 13 and entry channel 10 and the curvature of the entry channel, the pivot pin can be removed from seat 9 only when lateral or longitudinal displacement is accompanied by simultaneous rotation of the temple piece about the pivot. This locking action holds the temple piece securely in position and prevents unintentional separation of the parts, and this is true regardless of whether the temple piece is in the open or wearing position or in the closed or folded position. At the same time, it is a relatively simple matter for one to slide pivot pin 13 out of seat 9 and along channel 10 while simultaneously rotating the temple piece in order to separate the temple piece from the rim and open the rim to facilitate removal or insertion of a lens. Once the desired lens is in place, flanges 6 and 7 are mated to form the composite lug and pin 13 is passed through entry channel 10 to seat 9 while simultaneously rotating the temple piece in the opposite direction in order to reassemble the eyeglass frames.

Figure 4:
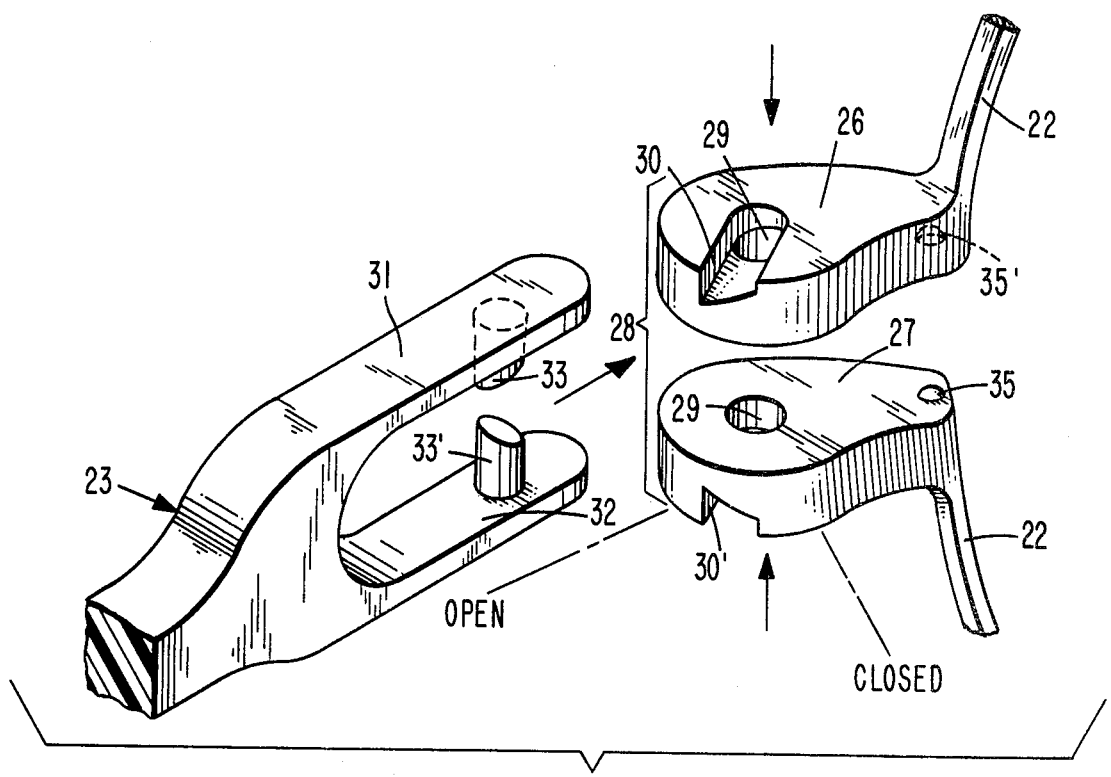
FIG. 4 is an exploded perspective view of the rim end of a temple piece and the flanges which make up the composite lug of an alternate embodiment of the eyeglass frames of the present invention.

FIG. 4 illustrates an alternate embodiment of the eyeglass frames of the present invention. For convenience sake, only the joint between the temple piece and the rim has been illustrated as the remaining portions of the eyeglass frames are the same as shown in FIG. 1. FIG. 4 illustrates segments of a split rim 22 and the rim end of a temple piece 23. Flanges 26 and 27 are formed on rim 22 adjacent the split on either side thereof. Upper flange 26 and lower flange 27 are designed to mate in order to form a composite lug 28. A pivot pin seat in the form of an aperture 29 extends through lug 28 from top to bottom. Leading from the periphery of lug 28 to aperture 29 is an entry channel means comprising upper and lower grooves 30 and 30' respectively, each having an inclined or beveled bottom. When flanges 26 and 27 are mated, raised portion 35 on flange 27 fits into recess 35' on flange 26 in order to assure proper positioning of the flanges to form the composite lug 28.

The rim end of temple piece 23 is provided with upper and lower mounting arms 31 and 32 respectively from which are extended in turn upper and lower pivot pins 33 and 33' respectively. The free ends of pivot pins 33 and 33' are inclined or beveled at an angle matching the inclination of the bottoms of grooves 30 and 30'. This arrangement is designed so that when flanges 26 and 27 are mated, pins 33 and 33' can be passed through grooves 30 and 30' until the pins seat in aperture 29. However, the pivot pins will only pass through the grooves when the temple piece is oriented in such a way that the inclination of the beveled ends of the pivot pins is aligned with the inclination of the bottoms of grooves 30 and 30'. Rotation of the temple piece to any other orientation positively prevents the pins from passing either in or out through the grooves. Preferably the orientation of the temple piece at which the pivot pins can pass through the entry channel grooves is intermediate the position assumed by the temple piece when the glasses are in the open position and that assumed by the temple piece when the glasses are in the closed position. Thus, the assembly will remain secure both while the glasses are being worn and while they are folded for storage. As before, the combined thickness of flanges 26 and 27 is approximately equal to the spacing between upper and lower mounting arms 31 and 32 so that rim 22 is securely closed when the flanges are received between the mounting arms.

Figure 5:
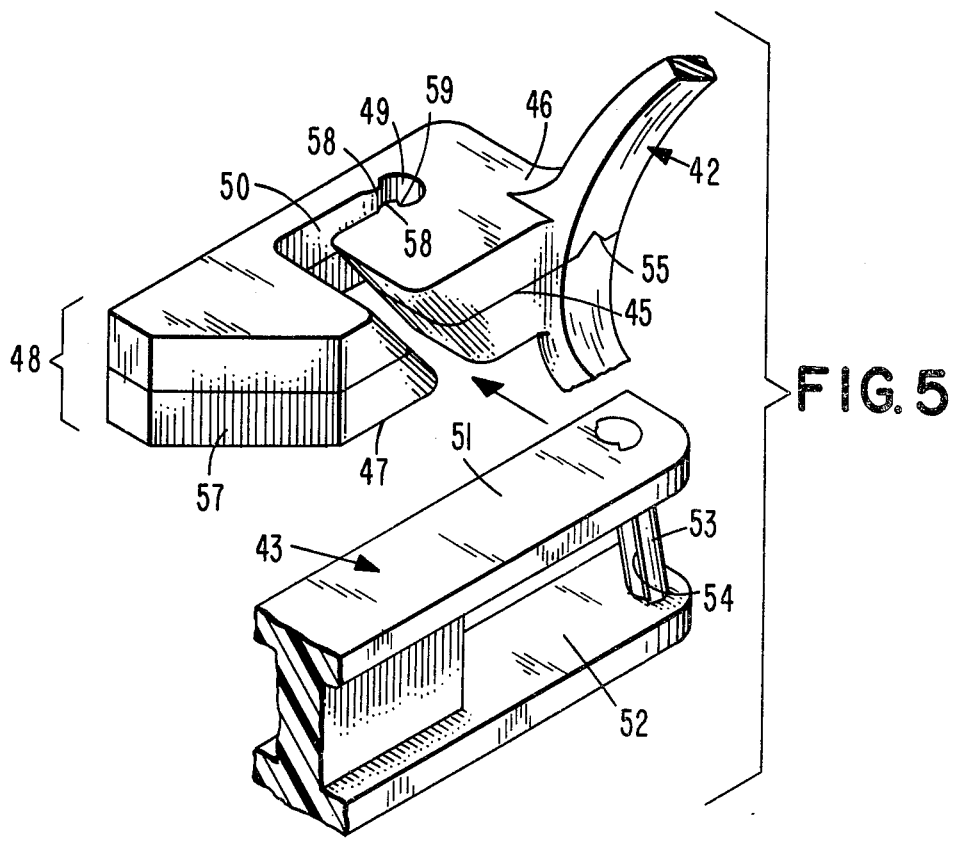
FIG. 5 is a perspective view of a disassembled rim end of a temple piece and composite lug of a second alternate embodiment of the eyeglass frames of the present invention.

FIG. 5 illustrates a second alternate embodiment of eyeglass frames according to the present invention. As in the case of FIG. 4, only the joint between the lens rim and the rim end of the temple piece is illustrated because it is understood that the remainder of the eyeglass frames is the same as shown in FIG. 1. Rim 42 is split at 45 and provided with upper and lower flanges 46 and 47 respectively adjacent the split on opposite sides thereof which mate to form a composite lug 48. A ridge and groove arrangement is provided at 55 in order to insure proper mating of the flanges. A pivot pin seat 49 is formed in lug 48 extending through the lug from top to bottom, and an entry channel 50 extends from the periphery of the lug to the pivot pin seat.

The rim end of temple piece 43 is provided with upper and lower mounting arms 51 and 52 respectively between which is extended a pivot pin 53 adapted to pass through entry channel 50 and be received in seat 49. A beveled surface 57 on lug 48 prevents the temple piece from being rotated outwardly past the normal wearing position. Pivot pin 53 and the initial portion of inlet channel 50 are both inclined so that the pin can pass through the channel only when the temple piece is oriented in such a way that the inclination of the pin matches the inclination of the channel. Seat 49 is also inclined so that a locking action is provided when pin 53 is seated therein. Inlet channel 50 is narrowed slightly at 58 in order to provide a slight constriction which assists in holding pin 53 in seat 49. A slight ridge is provided in seat 49 at 59 which mates with a groove 54 on pin 53 in order to further provide an intensified locking action. Although ridge 59 and groove 54 are positioned in the drawing to lock the pin in the seat when the temple piece is in the open position, it should be understood to be within the scope of the present invention to form a similar ridge and groove on the opposite sides of the seat and pin respectively in order to lock the pin in the seat when the temple piece is in the closed position. Formation of groove 54 may be carried out in such a way that pin 53 is spread slightly in order to press against the sides of seat 49 in order to assist in retaining the pin in the seat.

Figure 6:
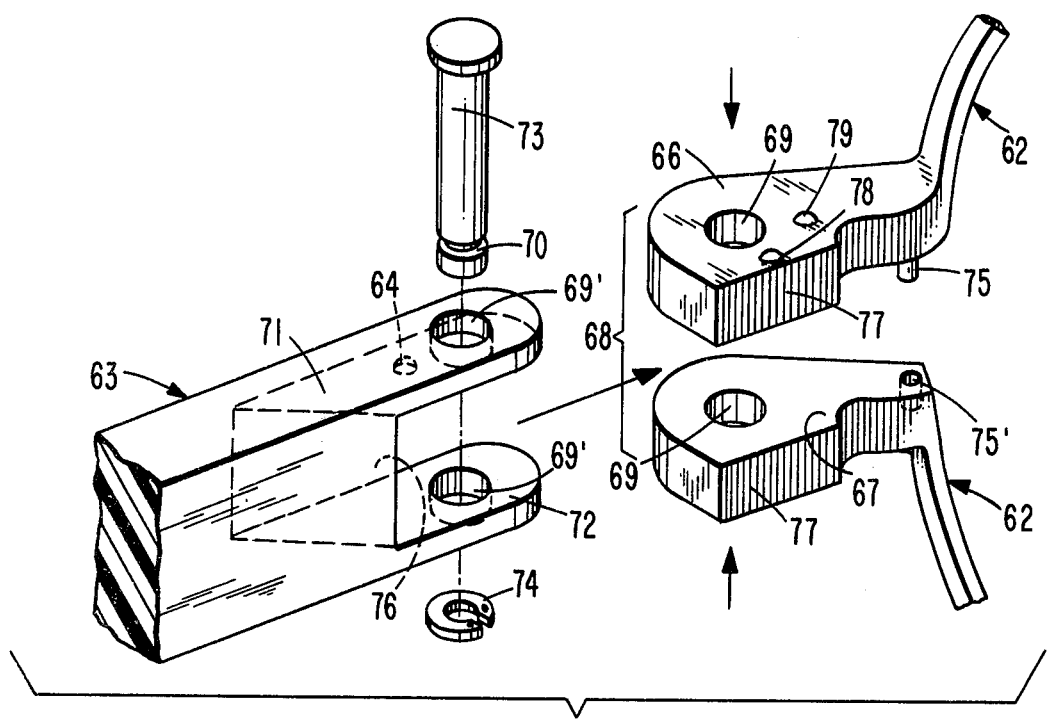
FIG. 6 is an exploded perspective view of the rim end of a temple piece and the flanges which make up the composite lug of a third alternate embodiment of the eyeglass frames of the present invention.

FIG. 6 illustrates the joint between the rim and the rim end of a temple piece in a third alternate embodiment of eyeglass frames according to the present invention. As in the case of FIGS. 4 and 5, the unillustrated portions of the glasses' frames correspond to the frames illustrated in FIG. 1. Rim 62 is split and provided with flanges 66 and 67 adjacent the split on opposite sides thereof. Flanges 66 and 67 mate to form a composite lug 68 and are provided with an indexing pin 75 which is received within an indexing recess 75' when the flanges are mated to close the rim in order to assure proper alignment of the flanges. The rim end of temple piece 63 is provided with upper and lower mounting arms 71 and 72 respectively, the spacing of which corresponds to the height of lug 68 formed by the mating of flanges 66 and 67 so that rim 62 will be held in the closed position when the lug is received between the mounting arms of the temple piece. Lug 68 and mounting arms 71 and 72 are provided with aligned apertures 69 and 69' through which is extended a removable pivot pin 73 which in turn is secured in position by inserting a resilient split ring fastener 74 in a receiving groove 70 at the base of the pin. The end surface 76 between mounting arms 71 and 72 on temple piece 63 engages a beveled corner 77 on composite lug 68 in order to prevent the temple piece from being rotated outwardly beyond the normal wearing position. Raised portions 78 and 79 are provided on the upper surface of flange 66 in such a position that they will engage recess 64 formed on the underside of the upper mounting arm 71 when the temple piece is in the wearing position. A similar raised portion 79 is provided to engage recess 64 when the temple piece is in the folded position. Raised portion 78 and 79 and recess 64 constitute a type of detent mechanism which prevents the temple piece from swinging freely between the wearing position and the folded position, but instead tends to hold the temple piece in the desired position.

Figure 7:
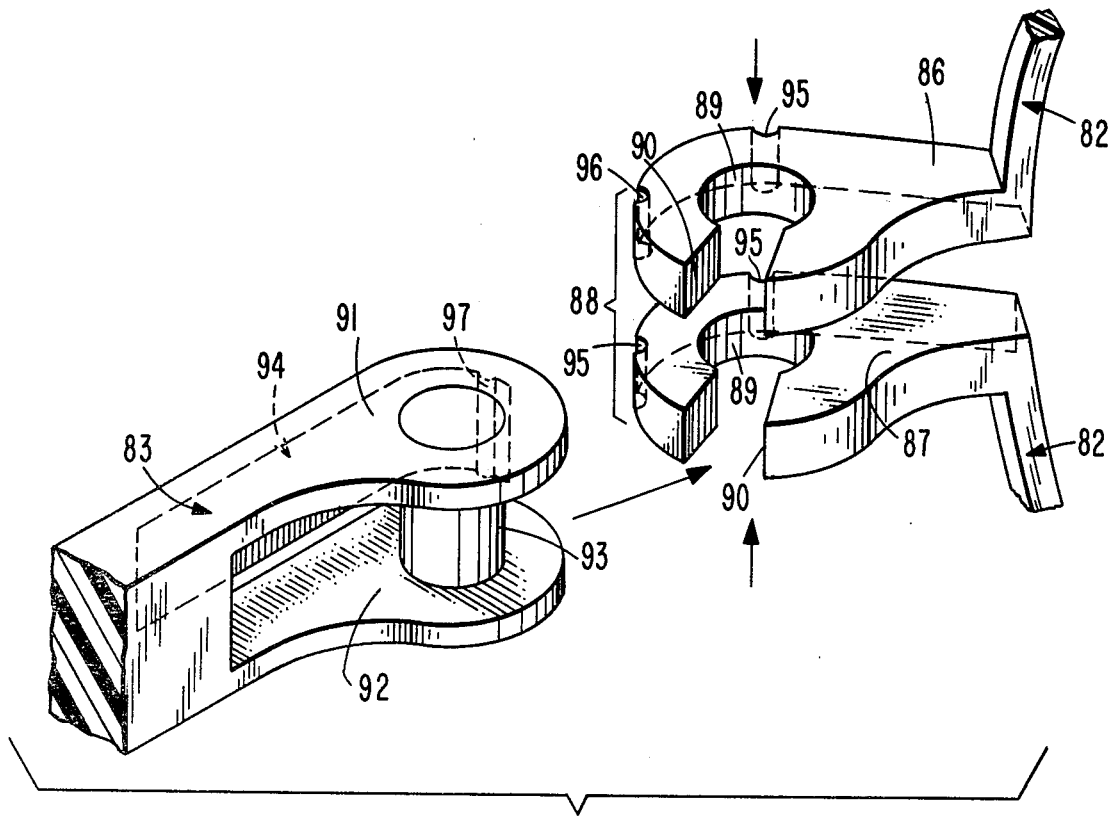
FIG. 7 is an exploded perspective view of the rim end of a temple piece and the flanges which make up the composite lug of a fourth alternate embodiment of the eyeglass frames of the present invention.

FIG. 7 depicts the joint between the temple piece and the rim of a fourth alternative embodiment of the eyeglass frames of the present invention. Rim 82 is split and provided with upper and lower flanges 86 and 87 respectively which mate to form a composite lug 88. A pivot pin seat 89 extends through the composite lug from top to bottom, and an entry slot 90 leads from the periphery of the lug to the seat 89. Grooves 95 are provided on the periphery of flanges 86 and 87 in order to receive a semi-circular wrinkle 97 formed in the end of a J-shaped detent spring 94 which is mounted on the outside of temple piece 83 and extends around the front of lug 88 to groove 95 when the temple piece is in the open position to hold the temple piece in place. When temple piece 83 is folded to the closed position, the end of spring 94 is received in groove 96 at the side of lug 88 again to hold the temple piece in the desired place. Because of the J-shaped configuration of spring 94, pin 93 can be passed through entry channel 90 to attach or detach a temple piece 83 only when the temple piece is in the closed position.

Upper and lower mounting arms, 91 and 92 respectively, are provided at the rim end of temple piece 83, and a vertical pivot pin 93 is secured between the mounting arms. The diameter of pivot pin 93 is slightly greater than the width of entry channel 90 so that the channel must be spread slightly as the pivot pin is forced therethrough into seat 89. The resilience of the material from which the eyeglass frames are formed tends to hold the pivot pin in the seat once it is there. The temple piece may be separated from the rim by merely exerting sufficient force on the temple piece in the direction of the entry channel to spread the entry channel and pull the pivot pin therethrough. As in the other embodiments, when lug 88 is received between mounting arms 91 and 92, rim 82 is securely closed and a lens therein is held fast.

It will be appreciated that if it is desired to have eyeglass frames without split rims and removable lenses, the lug and pin arrangement of the present invention is nevertheless remarkably well adapted for securing a temple piece to the associated rim in such a way that it will not separate inadvertantly and yet can be readily removed without the need of special tools.

The entry channel means may assume various configurations. For example, it may be straight as in the embodiments of FIGS. 4 and 7, L-shaped as in the embodiment of FIG. 5 or it may have a curved, hook shape as in the embodiment of FIGS. 1-3. Other shapes, such as an S, Z or even a question mark shape, are also possible.

It also will be appreciated that the eyeglass frames of the present invention may be made from any suitable plastic material such as polyacrylonitrile-butadiene-styrene, or a polycarbonate such as G.E.'s Lexan by any suitable molding procedure such as injection molding, at a cost significantly less than the cost of present eyeglass frames which utilize tiny metal hinges or findings. Selection of an appropriate plastic and molding technique are considered to be within the skill of the art and form no part of the present invention. Metal could also be utilized to fashion eyeglass frames according to the present invention. With either material, findings would not be necessary and the consequent cost of the frames would be reduced.

It will be seen that the eyeglass frames of the present invention facilitate ready removal and replacement of lenses by persons without special skills or special tools so that new lenses can be inserted in a pair of old frames or a single set of lenses can be switched between several rims and/or temple pieces of different colors which match different outfits of clothing.

The foregoing embodiments of the invention have been described solely to exemplify the invention and are not intended to limit the scope thereof. The scope of the invention is defined by the following patent claims.

I claim:

1. A pair of eyeglass frames comprising:
right and left lens rims joined to each other,
each of said rims being split at a point generally opposite the point where it is joined to the other rim to facilitate insertion and removal of a lens,
a pair of flanges on each rim adjacent the split on each side thereof,
the flanges of each pair mating to form a composite lug when the split in the rim is closed,
pivot and seating means in each composite lug comprising a pin receiving aperture extending through the composite lug from top to bottom,
entry channel means in each composite lug comprising an open slot extending through the composite lug from top to bottom and leading from the pheriphery of said lug to the pin receiving aperture, at least a portion of said entry channel means being inclined from vertical,
a pair of right and left temple pieces each having an upper mounting arm and a lower mounting arm projecting from the rim end thereof, said upper and lower mounting arms being spaced apart a distance corresponding to the combined vertical height of the mated flanges which make up the composite lug,
pivot pin means comprising a single inclined pin extending from the upper mounting arm to the lower mounting arm of each temple piece,
said pivot pin means being physically oriented to pass through said entry channel means in one of the composite lugs only when the temple piece in which the pin is mounted is oriented at one particular angle with respect to the adjacent rim; siad pivot pin and said aperture being configured such that the pin will seat in the pin receiving aperture whereby the flanges of the composite lug are secured in mating position between the upper and lower mounting arms of the temple piece, and the associated rim is locked in the closed position.

2. A pair of eyeglass frames as recited in claim 1 wherein each composite lug engages the outer surface of the associated temple piece to lock the temple piece against rotating to a position where it forms an included angle with the adjacent rim greater than that angle formed when the temple piece is in the normal wearing position.

3. A pair of eyeglass frames as recited in claim 1 wherein the horizontal cross-sectional configuration of said entry channel is generally L-shaped.

4. A pair of eyeglass frames as recited in claim 1 further comprising means for urging the temple pieces to exert a slight pressure against the head of a wearer.

5. A pair of eyeglass frames as recited in claim 1 further comprising means to retain said pivot pin in said pin receiving aperture.

6. A pair of eyeglass frames as recited in claim 1 further comprising guide means for assuring proper positioning of the mating flanges with respect to each other.

7. A pair of eyeglasses as recited in claim 1 further comprising means for holding the temple pieces in the closed position.

8. A pair of eyeglass frames as recited in claim 1 wherein said right and left lens rims are joined to each other by a bridge portion.

9. A pair of eyeglass frames as recited in claim 1 wherein said entry channel means starts at the inside of said composite lug.

10. A pair of eyeglass frames as recited in claim 1 wherein each temple piece is a mirror image of the other and is associated with one of said composite lugs and will not fit the other composite lug.

11. A pair of eyeglass frames as recited in claim 1 wherein said pivot pin is curved.

12. A pair of eyeglass frames as recited in claim 1 wherein said pivot pin is spread and exerts pressure on the sides of the pivot pin seat.

13. A pair of eyeglass frames as recited in claim 1 wherein the horizontal cross-sectional configuration of said entry channel is curved.

14. A pair of eyeglass frames as recited in claim 13 wherein the cross sectional configuration of the entry channel is hook shaped.

15. A pair of eyeglass frames comprising:
right and left lens rims joined to each other, each of said rims bearing a mounting lug at a point generally opposite the point where it is joined to the other rim;
pivot pin seating means in each lug comprising a pin receiving aperture extending through the lug from top to bottom;
entry channel means in each lug comprising an open slot extending through the lug from top to bottom and leading from the periphery of the lug to the pin receiving aperture, at least a portion of said slot being inclined from vertical;
a pair of right and left temple pieces each having an upper mounting arm and a lower mounting arm projecting from the rim end thereof, said upper and lower mounting arms being spaced apart a distance corresponding to the height of the lug, and
pivot pin means comprising an inclined pin mounted between the upper and lower mounting arms of each temple piece, said pin being physically oriented to pass through the entry channel means in one of the lugs only when the temple piece in which the pin is mounted is oriented at one particular angle with respect to the adjacent rim, said pin and said aperture being configured such that the pin will seat in the pin receiving aperture.

16. A pair of eyeglass frames comprising:
right and left lens rims joined to each other,
each of said rims being split at a point generally opposite the point where it is joined to the other rim to facilitate insertion and removal of a lens,
a pair of flanges on each rim adjacent to the split on each side thereof,
the flanges of each pair mating to form a composite lug when the split in the rim is closed,
pivot pin seating means in each composite lug comprising a pair of oppositely directed, aligned recesses formed in the top and bottom of each composite lug,
entry channel means in each composite lug comprising a pair of aligned grooves formed in the top and bottom of each composite lug leading from the periphery of said lug to said recesses, the bottom of at least one of said entry channel grooves in each lug being inclined with respect to the axis of the pivot pin seating means,
a pair of right and left temple pieces each having an upper mounting arm and a lower mounting arm projecting from the rim end thereof, said upper and lower mounting arms being spaced apart a distance corresponding to the combined vertical height of the mated flanges which make up the composite lug,
pivot pin means comprising a pair of opposed, aligned pins formed on the upper and lower mounting arms of each temple piece, the free end of at least one of said opposed pins on each temple piece being inclined with respect to the axis of the pin,
said inclined free end of said pivot pin means being physically oriented to pass through the entry channel grooves in one of the composite lugs only when the temple piece on which the pins are mounted is oriented at one particular angle with respect to the adjacent rim; said pivot pin means and said recesses being configured such that the pin means will seat in said recesses whereby the flanges of the composite lug are secured in mating position between the upper and lower mounting arms of the temple piece, and the associated rim is locked in the closed position.

17. A pair of eyeglass frames as recited in claim 16 further comprising means for retaining said pivot pin means in said recesses.

18. A pair of eyeglass frames as recited in claim 16 further comprising guide means for assuring proper positioning of the mating flanges with respect to each other.

19. A pair of eyeglass frames as recited in claim 16 further comprising means for holding the temple pieces in the closed position.

20. A pair of eyeglass frames as recited in claim 16 wherein said entry channel means starts at the inside of said composite lug.

21. A pair of eyeglass frames as recited in claim 16 wherein each temple piece is a mirror imge of the other and is associated with one of said composite lugs and will not fit the other lug.

* * * * *